M. J. BUNNELL.
COTTON CHOPPER.
APPLICATION FILED OCT. 6, 1909.
950,836.
Patented Mar. 1, 1910.
3 SHEETS—SHEET 1.
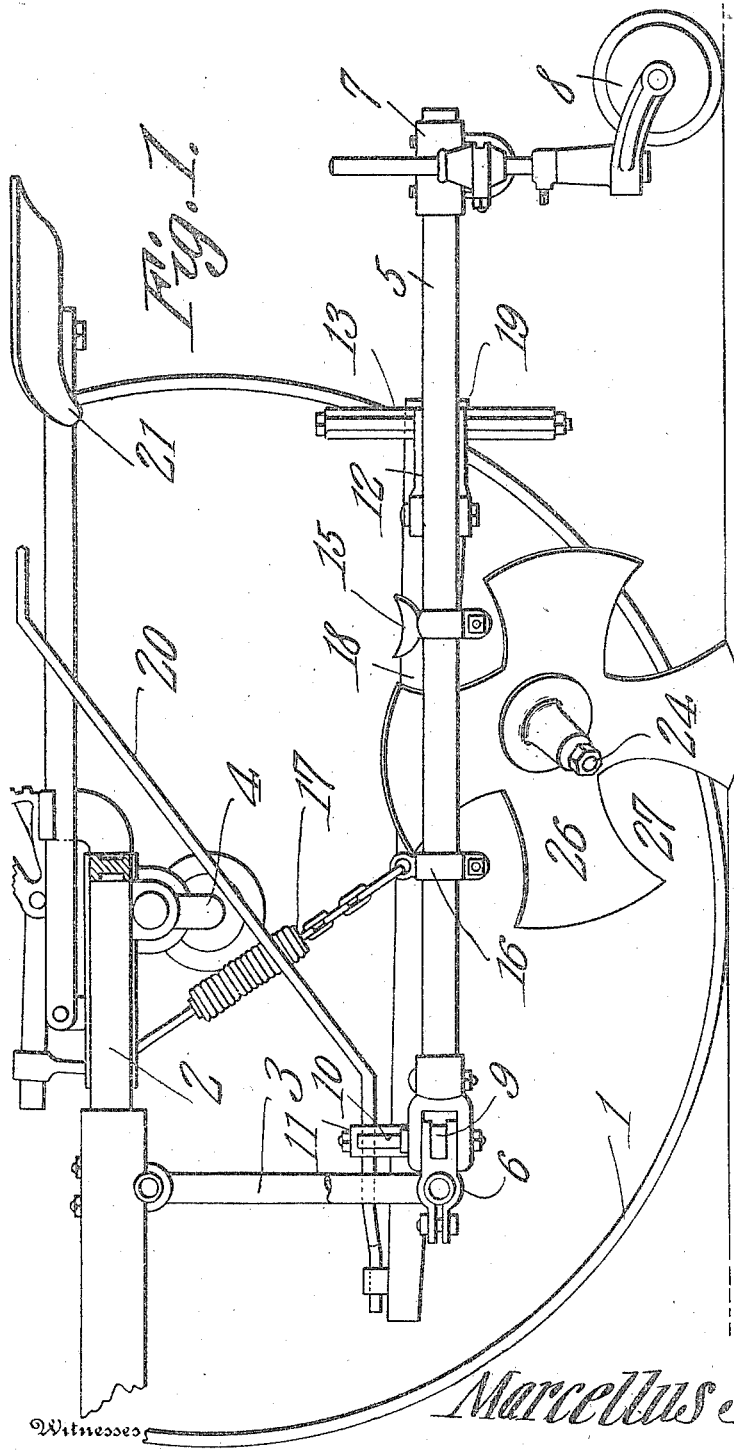
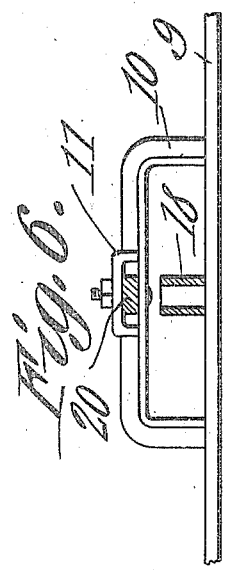

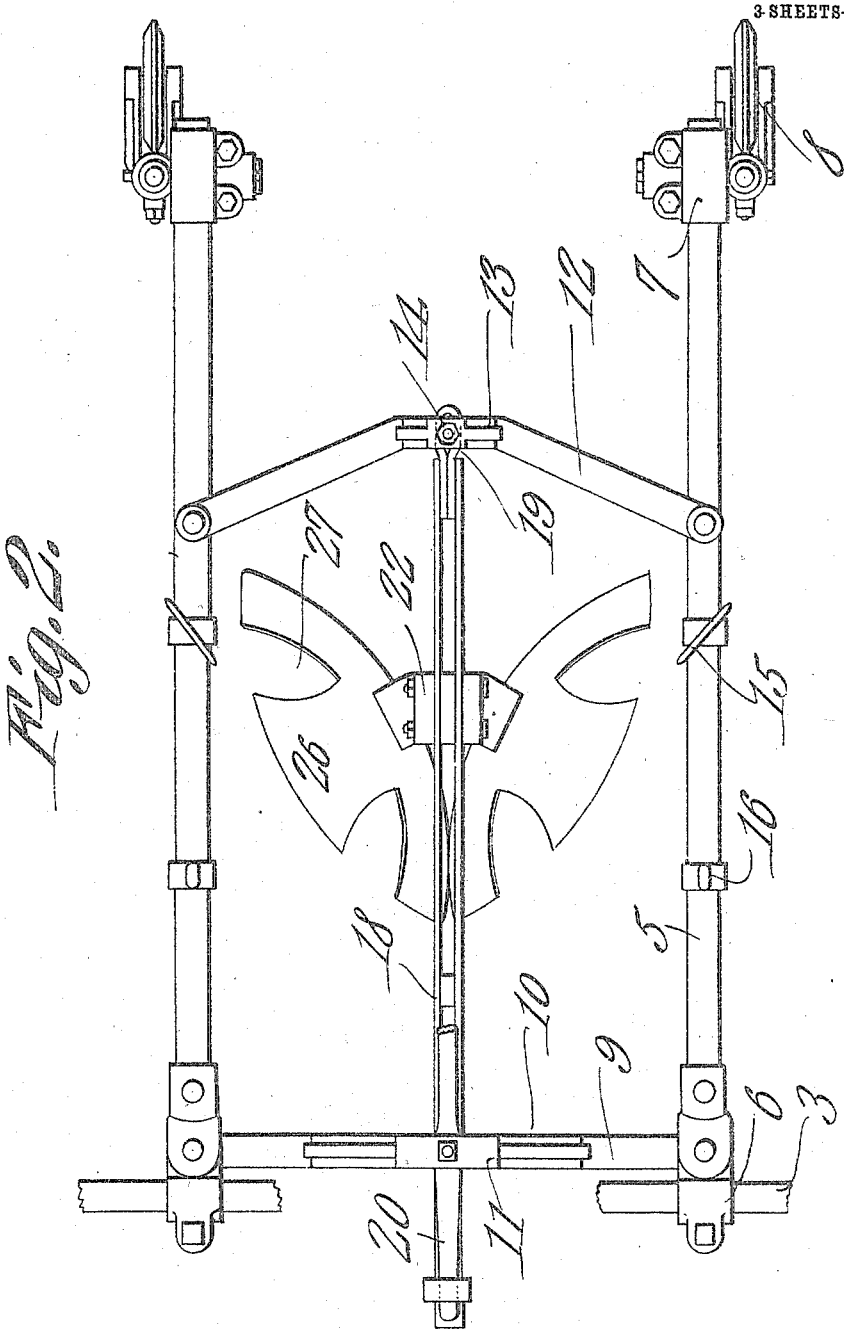

M. J. BUNNELL.
COTTON CHOPPER.
APPLICATION FILED OCT. 6, 1909.
950,836.
Patented Mar. 1, 1910.
3 SHEETS—SHEET 3.
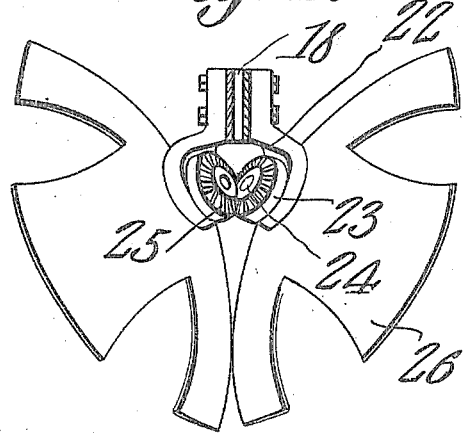
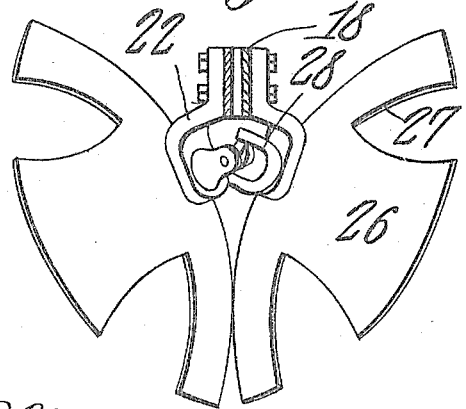
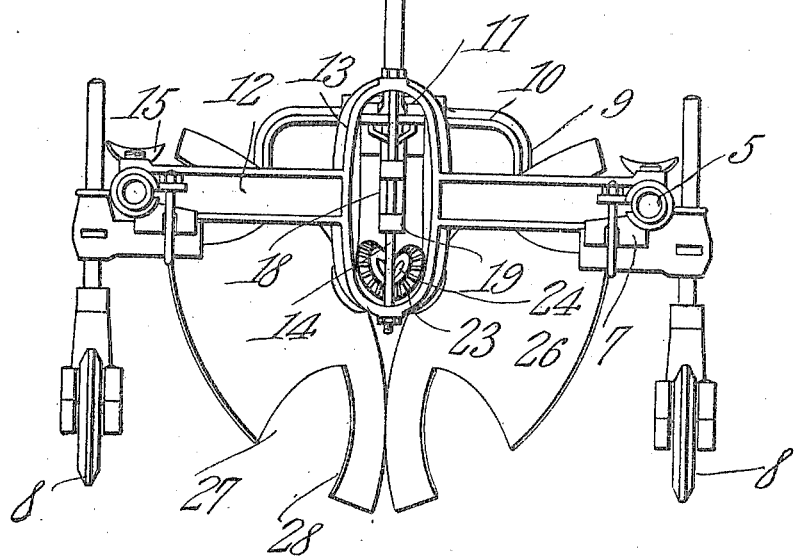
Witnesses
Inventor
Marcellus J. Bunnell.
By
Attorneys

UNITED STATES PATENT OFFICE.

MARCELLUS JACKSON BUNNELL, OF TAYLOR, TEXAS.

COTTON-CHOPPER.

950,836.

Specification of Letters Patent.   Patented Mar. 1, 1910.

Application filed October 6, 1909.  Serial No. 521,244.

*To all whom it may concern:*

Be it known that I, MARCELLUS J. BUNNELL, a citizen of the United States, residing at Taylor, in the county of Williamson and State of Texas, have invented a new and useful Cotton-Chopper, of which the following is a specification.

This invention has relation to cotton choppers and it consists in the novel construction and arrangement of its parts as hereinafter shown and described.

The object of the invention is to provide a simple and an effective device adapted to be attached to the frame of a sulky cultivator for the purpose of thinning, blocking or chopping cotton and while the attachment as shown and described hereinafter is especially adapted to be used in connection with a cultivator as described, it is to be understood that the cotton chopper may be used to advantage as an independent implement without attachment to a cultivator frame as indicated.

Therefore the chopper attachment comprises a beam, to the forward end of which may be applied a draft surface. A horizontal guide bar is located at the forward portion of the beam and is provided with clamps adapted to engage the arch bar of the frame of the cultivator to which the chopper is applied. A guiding lever is fulcrumed upon the bar and is connected to the forward end of the said beam. A cross frame is located at the rear of the beam and is provided with a vertical guide for the beam. A standard is fixed to the rear portion of the beam and is provided with angulary disposed bearings in which are journaled shafts. The said shafts are disposed at an angle to each other. Intermeshing gear wheels are attached to the inner ends of the shafts and are located in the space between the bearings of the standards. Disks are fixed to the said shafts and are located against the outer sides of the bearings of the standards and said disks are provided at their peripheries with recesses, the recesses of one disk registering transversely with the recesses of the other disk and vice versa. The disks are so arranged that they are located both together at their forward portions and diverge from each other at their rear portions. Consequently as the disks turn over in a forward direction as the cotton chopper progresses along a row of standing plants the disks engage the plants at those portions of their edges which are close together and as the said portions gradually move away from each other the plants thus engaged are pushed or removed out of the row of plants and are thus destroyed while those plants which occur at the recesses are left standing in the row.

In the accompanying drawings:—Figure 1 is a view of a portion of a sulky cultivator showing the cotton chopper in side elevation attached thereto. Fig. 2 is a top plan view of the cotton chopper. Fig. 3 is a rear end elevation of the cotton chopper. Figs. 4 and 5 are sectional views through the beam of the chopper showing different forms of means for connecting the disks or disk shafts. Fig. 6 is a detail view of a bar used in the chopper structure.

As illustrated in Fig. 1 of the drawings, the cotton chopper attachment is applied to a sulky cultivator which includes the usual ground wheels 1 upon which is mounted a frame 2 including an arch bar 3, and an arch angle 4 to which the supporting wheels 1 are journaled. Side beams 5 are pivotally connected at their forward ends with clamp devices 6 which are adapted to engage the end portions of the arch bar 6. Bearing blocks 7 are adjustably mounted upon the rear portions of the side bars 5 and supporting wheels 8 are freely castered in the said blocks 7. If desired, plows (not shown) may be attached to the side bars 5.

A cross bar 9 is connected at its ends with the clamp devices 6 and is provided at a point intermediate of its ends with a horizontally disposed guide 10 over which is located an eye or loop 11.

A cross bar 12 is pivotally connected at its ends with the rear portions of the side bars 5 and a portion intermediate of its ends is provided with a vertically disposed opening 13 in which is located a vertically disposed guide rod 14. Stirrups 15 are mounted upon the side bars 5 and eye clips 16 are also mounted upon the said side bars.

Spring traction devices 17 are connected at their upper ends to the frame 2 of the cultivator and at their lower ends with the eye clips 16 and are adapted to resiliently support the rear end portions of the side bars 5 and their attachment.

A beam 18 is located at its forward portion in the guide 10 of the cross bar 9 and at its rear end the said beam is provided with a horizontal loop or eye 19 which receives the rod 14.

A lever 20 is fulcrumed in the loop or opening 11 carried by the cross bar 9 and the forward end of the said lever is connected (pivotally or otherwise) with the forward portion of the beam 18. The rear end of the lever 20 extends back to within convenient reach of one occupying the operator's seat 21 carried by the frame 2 of the cultivator.

Standards 22 are fixed to the beam 18 at a point intermediate the ends thereof and are provided with spaced bearings 23 which are disposed at an angle to each other. The inner ends of shafts 24 are journaled in the bearings 23 and consequently the axes of the said shafts 24 are disposed at an angle to each other. Crown gear wheels 25 are fixed to the inner ends of the shafts 24 and intermesh with each other in the manner as indicated in Fig. 3 of the drawings.

Disks 26 are fixed to the outer portions of the shafts 24 and at their inner faces bear against the outer sides of the standards 22. By reason of the inclination of the shafts 24 with relation to each other disks 26 are pitched at an angle to each other and as the said disks 26 are concaved they approach each other at their forward portions but diverge from each other at their rear portions. The shafts 24 are also so pitched with relation to each other that the said disks 26 approach each other at their lower portions and diverge from each other at their upper portions as can be seen in Fig. 3 of the drawings. The disks 26 are provided at their peripheries at regular intervals with recesses 27 and the recesses of one disk register with the recesses of the other disk transversely of the beam 18.

The operation of the cotton chopper is as follows:—Presuming that the chopper is attached to a sulky cultivator as indicated, as the cultivator is drawn along a row of standing plants, an operator may manipulate the guiding lever 20 so as to cause the lower approaching portions of the disk 26 to run along the row of plants. As the shafts 24 are free to rotate in their bearings but are confined by means of the intermeshing crown wheels 25 to simultaneous rotation the disk 26 may rotate and as the spatula portion of the said disk occurring between the recesses 27 engage the plants standing in the row they will have a tendency to move the plants laterally and cut the same from the row and pass them at the side of the original row as the said spatula portions of the disks move in a rearward and upward direction. The plants occurring in the row at those points where the recesses 27 bridge the same are left standing in their original positions in the soil and constitute those plants forming the standing plants. By the use of the lever 20 an operator may control minor directing or guiding of the course of the said disks. He may also place his feet in the stirrup 15 and move the side bars 5 laterally whereby major guiding of the disks may be accomplished. By reason of the fact that the rear end of the beam 18 is guided vertically and may move in a vertical direction, the disk 26 may follow any irregularities in the surface of the soil and cut practically at a uniform depth below the surface thereof.

In the modified form of the assemblage of parts illustrated in Fig. 5 of the drawings, the intermeshing gear wheels 25 are dispensed with and in their stead a universal joint connection 28 is provided between the inner ends of the shafts 24, said universal joint will permit the said shafts to rotate but confines such rotation to simultaneous action, thereby the recesses 27 of the disks are held in proper transverse register as above described.

Having described my invention, what I claim as new and desire to secure by Letters Patent is:—

1. A cotton chopper comprising a beam, a cross bar having a horizontal guide receiving the forward portion of the beam, a lever fulcrumed to the cross bar and engaging the forward end of the beam, means for attaching the cross bar to the frame of an implement, a cross bar having a vertically disposed guide engaging the rear portion of the beam, side bars connecting the ends of the said cross bars together, and guiding stirrups mounted upon the said side bars.

2. A cotton chopper comprising a beam, a cross bar having a horizontally disposed guide receiving the forward portion of the beam, a lever fulcrumed to the cross bar and engaging the forward end of the beam, means for attaching the cross bar to the frame of an implement, a cross bar having a vertically disposed guide which engages the rear portion of the beam, side bars pivotally connected at their forward ends with the first said cross bar and having pivotal connection with the last said cross bar, cotton chopping disks carried by the beam and guiding stirrups mounted upon the said side bars.

In testimony that I claim the foregoing as my own, I have hereto affixed my signature in the presence of two witnesses.

MARCELLUS JACKSON BUNNELL.

Witnesses:
G. D. PATTERSON,
GEO. W. ATKINSON.